US007941410B2

(12) United States Patent  (10) Patent No.: US 7,941,410 B2
Sagar et al.  (45) Date of Patent: May 10, 2011

(54) METHOD AND SYSTEM OF MANAGING CONFLICTS FOR A SET OF SYNCHRONIZED FOLDERS

(75) Inventors: Akash Sagar, Redmond, WA (US); Richard Yiu-Sai Chung, Bothell, WA (US); George Moromisato, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 12/242,372

(22) Filed: Sep. 30, 2008

(65) Prior Publication Data

US 2010/0082534 A1 Apr. 1, 2010

(51) Int. Cl.
*G06F 7/00* (2006.01)
(52) U.S. Cl. .................... 707/691; 707/802; 707/829
(58) Field of Classification Search ........... 707/999.101, 707/691, 802, 829
See application file for complete search history.

(56) References Cited

U.S. PATENT DOCUMENTS

| | | | |
|---|---|---|---|
| 5,812,773 A * | 9/1998 | Norin | 709/204 |
| 6,247,135 B1 | 6/2001 | Feague | |
| 6,256,676 B1 | 7/2001 | Taylor et al. | |
| 6,324,544 B1 * | 11/2001 | Alam et al. | 1/1 |
| 6,757,696 B2 * | 6/2004 | Multer et al. | 1/1 |
| 7,685,177 B1 * | 3/2010 | Hagerstrom et al. | 707/999.204 |
| 7,822,711 B1 * | 10/2010 | Ranade | 707/622 |
| 2004/0015456 A1 * | 1/2004 | Holtz et al. | 706/11 |
| 2004/0205069 A1 * | 10/2004 | Ishizawa | 707/10 |
| 2004/0230572 A1 * | 11/2004 | Omoigui | 707/3 |
| 2004/0267797 A1 * | 12/2004 | Wilson | 707/101 |
| 2005/0033732 A1 * | 2/2005 | Chang et al. | 707/2 |
| 2005/0055380 A1 * | 3/2005 | Thompson et al. | 707/200 |
| 2005/0223047 A1 * | 10/2005 | Shah et al. | 707/201 |
| 2005/0289383 A1 | 12/2005 | Illowsky et al. | |

(Continued)

OTHER PUBLICATIONS

"FeedSync: Synchronization for the Web," Microsoft Corporation, 2008, http://dev.live.com/feedsync/default.aspx.

(Continued)

*Primary Examiner* — Hung T Vy
*Assistant Examiner* — Phuong-Thao Cao

(57) ABSTRACT

Generally, the described system and process enables resolution of conflicts in a synchronized folder. Within the described mesh operating environment, each of the devices may be configured to do the same processing so that the file system view of the synchronized folder looks the same on all devices (pending local capabilities). Updates that cannot be immediately realized to the local store due to conflicts may be deferred for later attempts when, for example, additional updates at the system level or local level are made to resolve or eliminate the conflict for the update item. Generally, further changes may be propagated by a user in addressing a particular conflict that the user is notified about (e.g., via a selected winner that the user disagrees with). Alternatively, the conflict may resolve itself when a further update occurs that overrides or renders moot the previous update (e.g., a deleted item having a modified enclosure, where the enclosure had a previous concurrency conflict).

Depending on the local file system, the described system and process may perform additional fix ups for file name, attributes, etc. In this case, the described system and process may be configured not to update a main replication feed since the updates are local or node application specific. Resolution may primarily depend on the user. When the user does resolve a conflict, the feed may be updated and the resolution propagated to all nodes.

20 Claims, 13 Drawing Sheets

U.S. PATENT DOCUMENTS

| | | | |
|---|---|---|---|
| 2006/0041893 | A1 | 2/2006 | Castro et al. |
| 2006/0047716 | A1* | 3/2006 | Keith .......................... 707/203 |
| 2006/0271602 | A1* | 11/2006 | Davis et al. ................... 707/201 |
| 2007/0011665 | A1 | 1/2007 | Gandhi et al. |
| 2007/0027929 | A1* | 2/2007 | Whelan ........................ 707/200 |
| 2007/0067349 | A1* | 3/2007 | Jhaveri et al. ................. 707/200 |
| 2007/0100834 | A1* | 5/2007 | Landry et al. .................... 707/10 |
| 2007/0103984 | A1* | 5/2007 | Kavuri et al. ............ 365/185.17 |
| 2007/0129014 | A1* | 6/2007 | Bertorello et al. ........... 455/41.2 |
| 2007/0294292 | A1 | 12/2007 | Hydrie et al. |
| 2008/0168183 | A1* | 7/2008 | Marcy et al. .................. 709/248 |
| 2010/0088271 | A1* | 4/2010 | Brixius et al. ................ 707/609 |

OTHER PUBLICATIONS

"Live Mesh as a Platform," Microsoft Corporation, 2008, http://blogs.msdn.com/livemesh/archive/2008/04/21/live-mesh-as-a-platform.aspx.

"Web 2.0: Microsoft Makes Big Bet for 'Software Plus Services' With Live Mesh," http://www.informationweek.com/news/services/hosted_apps/showArticle.jhtml?articleID=207401395&pgno=3&queryText=&isPrev=.

"FeedSync," Microsoft Corporation, 2008, http://dev.live.com/feedsync/default.aspx.

* cited by examiner

METHOD AND SYSTEM OF MANAGING CONFLICTS FOR A SET OF SYNCHRONIZED FOLDERS

TECHNICAL FIELD

The present invention generally relates to computer systems and more particularly to a computing system that manages conflicts for a set of synchronized folders.

BACKGROUND

A synchronized folder may represent a set of folders located across a plurality of nodes that are maintained to be consistent with one another. For example, each synchronized folder on each node may be consistent (e.g., same sub-folders, same folder organization, same files, etc.) with each folder of every other node. Maintaining consistency of the synchronized folder set among the plurality of nodes may be difficult enough when multiple changes are made across the set of folders. Maintaining consistency may be even more difficult in existing systems where the synchronized folder is hosted by devices running different operating environments (e.g., different applications, different operating systems, different file systems, etc.) that implement different semantics (e.g., file management and display semantics). In these situations, providing a consistent view of the synchronized folder to the local node may be more difficult because the different operating environments provide different restrictions on how items may be stored, maintained, displayed, and/or updated.

SUMMARY

The described method and system may take a series of actions to temporarily resolve at the local node some synchronization conflicts when processing an update to a set of synchronized folders. Some of the synchronization conflicts that may be temporarily resolved may arise when processing an update of the synchronized folder at a local node that implements a particular local semantic (that may be different from other nodes). Generally, the described method and system may create a special holding area folder and select winner and loser updates in handling synchronization conflicts. Winners may be displayed or otherwise made available as a selected update for a view of the synchronized folder at the local node while losers are stored in the holding area for later resolution. In some embodiments, a primary feed that provides updates to all nodes of the synchronized folder may not be modified based on the temporary fixes to any local node, thereby isolating local node processing of the updates. In some embodiments, orphan conflicts may be locally resolved by moving orphan files and folders to the holding area folder. Cycle conflicts may be locally resolved by choosing a folder with the smallest identifier and re-parenting that folder to the root. When duplicate item conflicts exist, the duplicate items may be sorted by identifier and all but the largest identifier may be moved to the holding area. All other conflicts detected by the described system may be preserved by moving unresolved losers to the holding area. The holding area may be a device level folder that may be protected from direct user access (e.g., hidden to user).

DRAWINGS

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
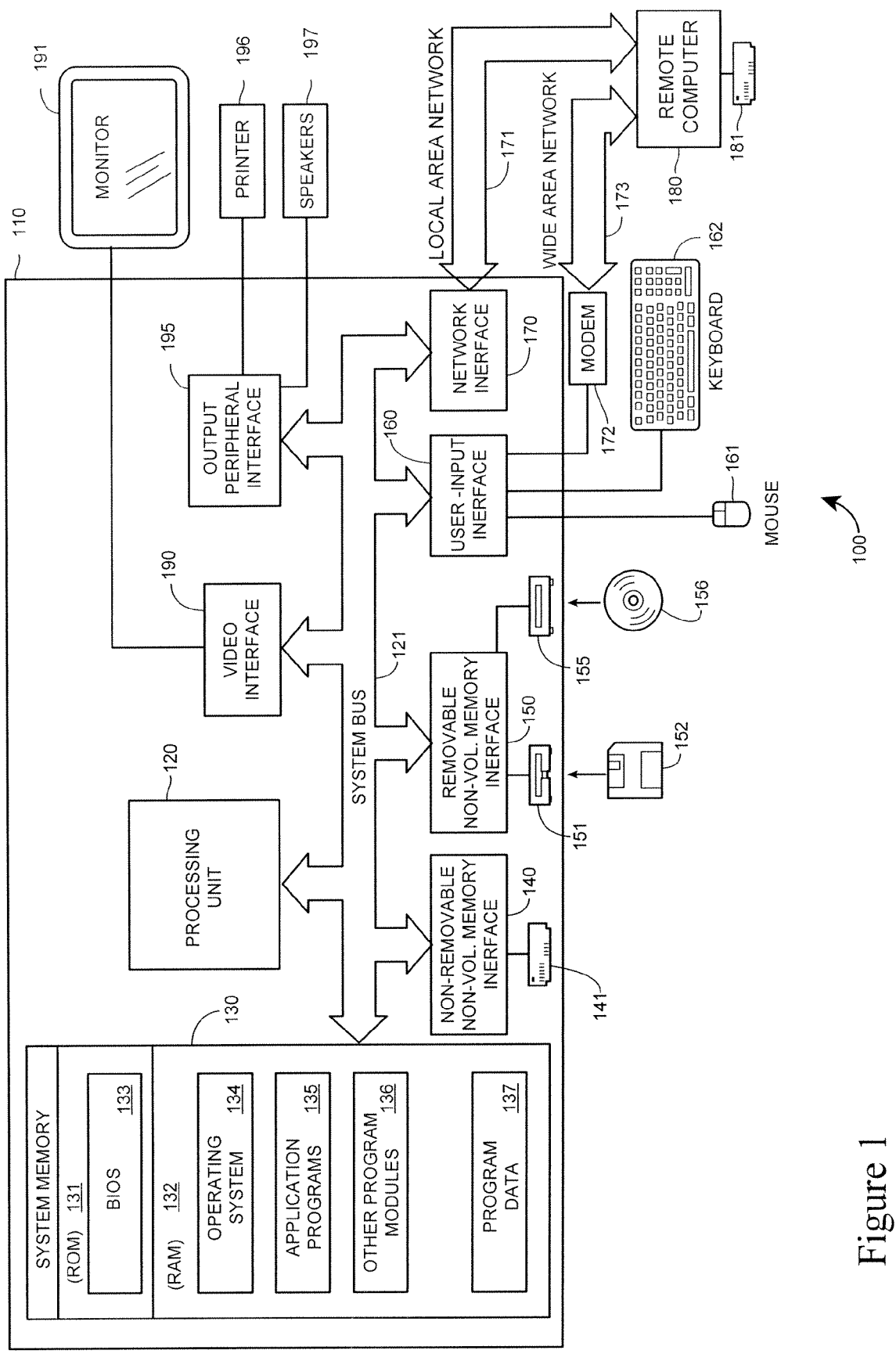
FIG. 1 illustrate block diagrams of a computing system that may operate in accordance with the described embodiments.

FIG. 1 illustrates an example of a suitable computing system environment 100 that may operate to display and provide the user interface described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to a optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
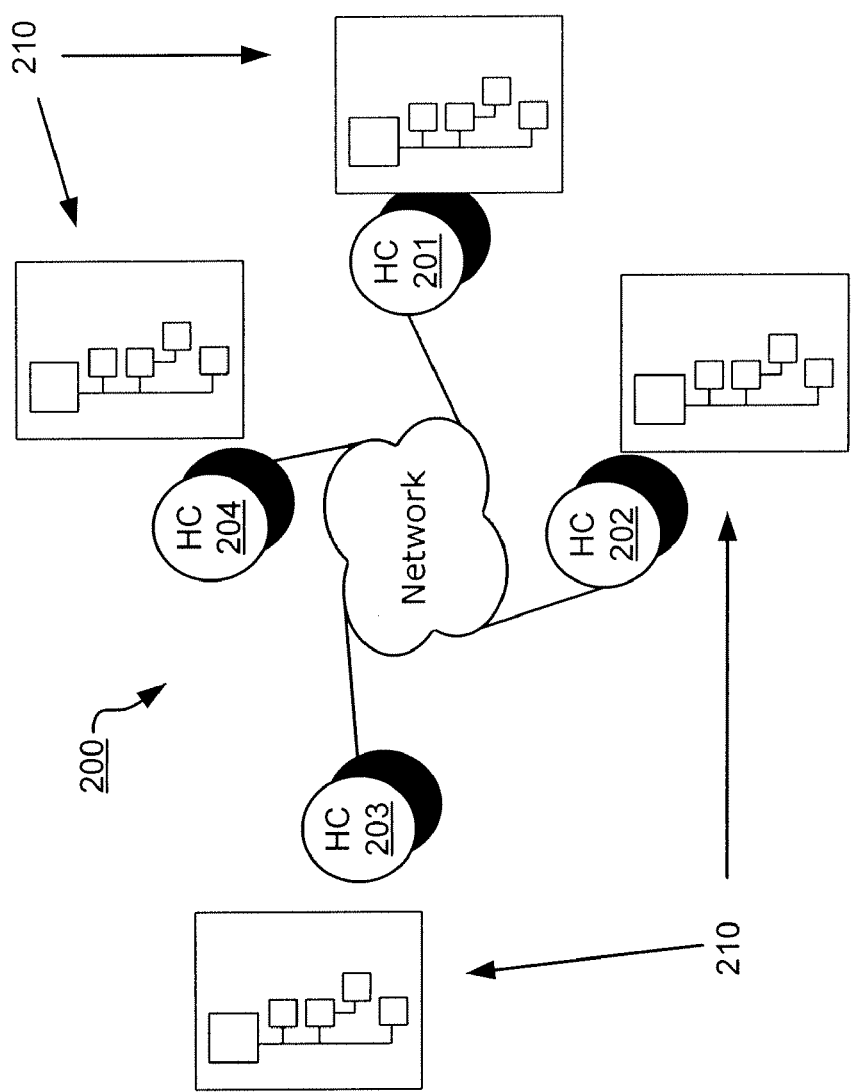
FIG. 2 illustrates a mesh with a synchronized folder.

Generally, a mesh may be considered a set of nodes or devices that are associated with each other, intercommunicate with each other, and share resources. FIG. 2 illustrates a mesh 200 that may be a peer to peer network where nodes of the network 201-204 share common services. A peer to peer configuration may be one out of many possible implementations for the mesh. Generally, software and services that enable devices and applications to run in a mesh may be called a mesh operating environment (MOE). The software and services may include application portions that run on each node and application portions that run external to each node but are available to each node via the mesh. It should be noted that a mesh device or node may be a physical device or virtual object that can participate in the mesh.

A file system generally includes a set of items, where an item may be a file or a folder. Files may generally be organized by folder, where the folder may represent a category in which a file is associated. A hierarchical tree structure may be formed where items are related to each other. For example, folders may include subfolders, where the folder is a parent and the subfolder is a child. A child may also be a file that is associated with a parent folder.

A synchronized folder 210 may represent a set of folders that are maintained to be consistent across a plurality of nodes or devices 201-204. In other words, a local copy of a synchronized folder at each node may be consistent with every other local copy of the synchronized folder at every other node. Maintaining consistency of the synchronized folder among a plurality of nodes may be extremely difficult where each node may modify their local synchronized folder (e.g., a local copy of the synchronized folder) and when multiple nodes may each be required to provide a local view of the synchronized folder consistent with local node semantics. For example, in some synchronized folder systems, a synchronized folder may be hosted by devices running different operating environments (e.g., different applications, different operating systems, different file systems, etc.) that may implement different operating semantics (e.g., file management and display semantics). Different operating environments may provide different restrictions on how items of the synchronized folder may be stored, maintained, displayed, or updated. In some embodiments of the described method and system, conflicts arising from differences in local semantics may be managed (to be discussed further below).

Generally, updates or changes to content may be propagated using a broadcast model in which a change in the synchronized folder at one node initiates a broadcast to all nodes of the mesh of the synchronized folder to indicate the change. Synchronization conflicts may represent conflicts between different update data (e.g., originated by updates at different nodes) for the same item or related item of the synchronized folder (where an item may be a folder or a file). Other conflicts may also arise due to the capabilities of the underlying file system.

A portion of the described method and system may involve providing a synchronization process for the synchronized folder (or synchronized folder set). The described method and system may use feeds as a communication protocol and format to facilitate synchronization of the synchronized folder. Generally, a feed is a data format that provides users with frequently updated content. An atom feed is a type of feed used to publish frequently updated works in a standardized format. Additionally, FeedSync is an open XML implementation that is used on top of an atom feed. It should be noted that an open implementation is one whose mechanics are public and whose usage is promoted for public consumption and modification. In the system and process described herein, a file system synchronization process may be layered on top of FeedSync, where a FeedSync feed may be used to synchronize and implement a synchronized folder.

The FeedSync feed may be a canonical or generic format used to enable universal interoperability and communication, where node specific semantics may be addressed at the node level. Generally, file system semantics or node level application semantics may be supported in two ways. One way may be to extend semantics of the FeedSync and require that all devices/nodes conform to such a modified FeedSync semantic. Another way may be to require that devices only understand a basic FeedSync feed (representing a canonical feed) and optionally interpret file system metadata contained in the feeds for the device or node (e.g., local node level involvement). The first approach may diminish the value of using FeedSync (since customization leads to a less open standard). Hence the described system may be implemented using the second node level approach.

In one embodiment, the described system and process may use an atom feed with FeedSync for the synchronization process. Generally, an atom feed may be a set of items, where each item includes an attribute for referencing an enclosure (e.g., a link) and includes attributes that describe a relationship of the item with another item. The enclosure may be a link to data that represents, for example, a file. An example of a system using atom feeds is Atom Publishing Protocol or APP. This protocol may be widely used for atom feeds and some embodiments of the described method and system may implement the atom feed as APP.

The atom feed may be configured to include a link attribute that is used to specify a location of a enclosure. Since enclosures (files) can be of arbitrary size, they may not be present inline in the FeedSync feeds but instead may be referenced out of band (e.g., using an attribute such as <link rel="enclosure">). The implication is that enclosures may be downloaded using a separate mechanism after a feed has been synchronized.

Feeds allow a hierarchical structure to be captured among feed items. For example, items in the feed that contain an enclosure (e.g., a file) are allowed to have a parent item which represents a folder. Such folder items in turn can have a parent folder. Multiple top level file or folder items are allowed. To preserve hierarchical structures, the feed may include a parent ID attribute that may be used to specify a hierarchy of files and folders to store a feed's enclosures on a device. This attribute, if present, may be required to have the same value of an FeedSync ID attribute of some other feed entry. The other entry may represent a parent folder and may also be required to have a link sub-element with an attribute type set to "folder." If the sub-element is omitted, the entry may manifest as a top level file or folder on a device. Multiple top level files or folders may be allowed.

A mesh operating environment implemented in some embodiments of the described system may be configured to set the FeedSync ID attribute. The ID attribute may be set to a new value upon creation of each item. In some embodiments, the ID values may be incrementally increasing values. In some embodiments, nothing outside the FeedSync layer and feed-level object creation is given the ability to modify or assign the id and by attributes. Because in a mesh environment these attributes may be assigned by outside applications in an unpredictable manner, the described system may be configured to ensure that applications do not begin relying upon hidden semantics of how these things happen to be assigned by MOE (i.e., via local node applications rather than mesh wide or MOE services).

Figure 3:
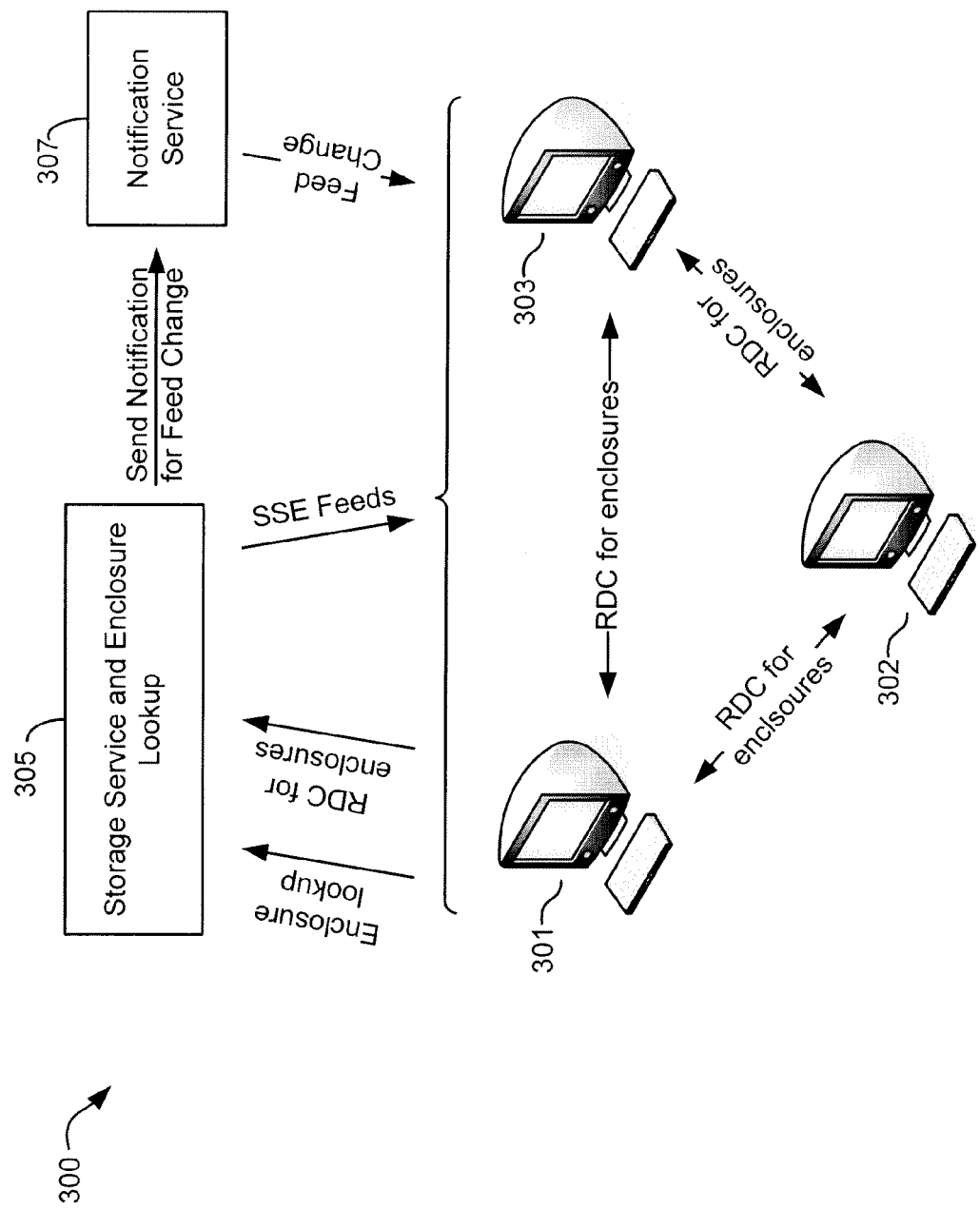
FIG. 3 illustrates a synchronized folder system according to one embodiment of a mesh operating environment.

FIG. 3 illustrates a synchronized folder system 300 according to one embodiment of a mesh operating environment. Generally, the system illustrated in FIG. 3 may represent a portion of a larger mesh operating environment that is particularly configured to provide synchronization services. In other words, the portion represented in FIG. 3 may represent only a portion of a larger MOE system including additional system services and communications and nodes.

Devices 301-303 may be nodes of a mesh that are interconnected to each other. In some embodiments, the nodes 301-303 may be implemented by a peer-to-peer network as known by those skilled in the art. System 300 illustrates a storage service and enclosure lookup service component 305 that may provide a set of feeds to the nodes of the mesh as well as an enclosure locator service. System 300 may also include a notification service 307 the provides indications of updates or changes in a feed.

In some embodiments, enclosures reference by items may be synchronized from the storage service. In some embodiments, enclosures referenced by items may be synchronized peer-to-peer. Devices generally synchronize their feeds (and thus the items within) only with the Storage Service. The Storage Service may store all feeds of all items of the synchronized folder.

Figure 4:
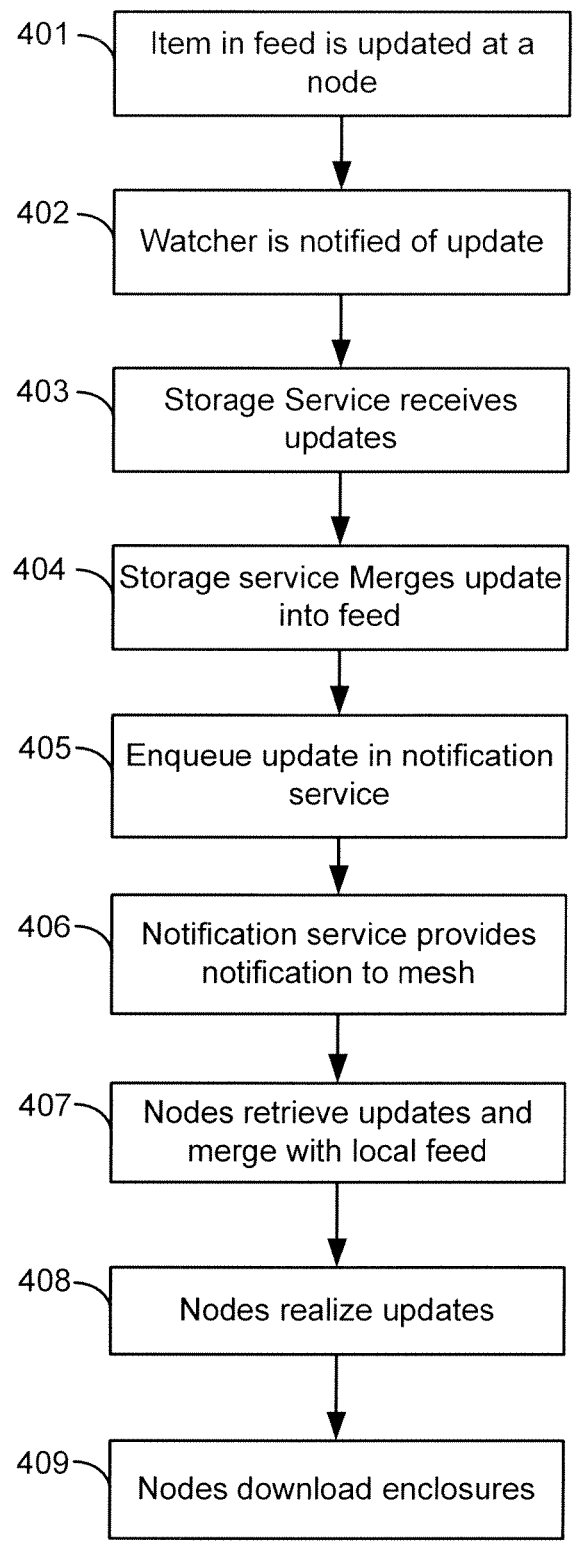
FIG. 4 illustrates a synchronization process embodiment.

FIG. 4 illustrates a synchronization process embodiment. At block 401, an item in a feed is updated (or created) on a device or node. MOE may sense that this item is updated (or created) 402. The sensing may be performed, for example, using a watcher component. A watcher component may be a monitoring component that is configured to receive update indications from a node of the mesh and facilitate alerting other nodes of the mesh about the update. The watcher component may further be configured to facilitate the update process by executing certain functions. The watcher may provide indications of updates along with the content of an update using feeds, such as an atom feed.

In some embodiments, the node may be configured to transmit a change or update indication to the storage service component when a change or modification has been made to the synchronized folder (e.g., a folder or item has been updated, moved, or deleted) of the local node. The watcher may be implemented as part of each node of the mesh or part of a service or both.

Node updates may be received at the storage service at block 403. The storage service may use FeedSync attributes to determine what changes should be brought up to the service, and logically pull those device-side changes MOE into the storage service. Note that although this process may logically appear to be a service-side pull, the retrieval may in fact be implemented via a device-side push because from a security perspective the service may not have permission to actually pull changes from the client. When the Storage Service "pulls", the Storage Service may receive a batch of updates with only portions of the updated feed that have been changed since the last time the service-based copy of the feed was updated by this device. This state, or knowledge (semantics defined by FeedSync rather than a node level application), may then be stored on the service (e.g., one entry for each mesh device). Each entry may contain state for a direction of data: a client pull direction and a service pull direction.

The Storage Service may merge the item changes into its feed at block 404. For example, the update data is merged with a storage service copy of the feed to result in an updated feed.

The update of the local feed may initiate generation of a notification that may be enqueued to the notification service at block 405 for processing. At block 406, the Notification Service may inform other devices that updates are available and may prompt nodes to pull changes down. Because the system implements a feed service, devices that come online (e.g., connect with the mesh) may receive updates once they subscribe for the notifications.

In some embodiments, the Storage Service's feed policy may specify that enclosures are to be uploaded to the Storage service before notifications are sent to other clients. This may help ensure that the client sourcing the enclosure will not be flooded with dozens of simultaneous upload requests that might hurt upload bandwidth. In some embodiments that implement quota constraints or for large client-side folders, the Storage Service may not attempt to upload enclosures.

Devices may use the same FeedSync algorithm to pull down changes (e.g., just the new updates) from the Storage Service and merge the changes or updates into their local copies of the feed at block 407. Nodes may realize the new feed or updates at block 408. Devices may also locate and replicate enclosures over if required at block 409 (whether from peers or from the Storage Service, as illustrated in FIG.

3, depending upon communications topology and where it's dynamically determined to be best to retrieve the enclosures).

Managing Conflicts During Synchronization of a Synchronized Folder Set

Processing of a feed received from the Storage Service may be performed in two blocks. The update items in the feed from the Storage Service may be merged with a local copy of the feed at a node. In one embodiment, merging the feed data may include associating or matching each item of the feed with corresponding items of the local feed copy based on an identifier of each item. In one embodiment, merging updates with the local feeds includes modifying the local feed to incorporate the updates. This may include overriding local feed information with the updates. In the described system, where the updates are incremental updates, the local feed may simply be updated to incorporate only the most recent changes.

Enclosures may then be downloaded and stored as files in a temporary directory. The enclosures may be made available to a local view of the file system (e.g., a view of the local copy of the synchronized folder).

It should be noted that a view of the synchronized folder may be implemented as a view store (which may be called a local folder) separate from a store containing a main feed, where the view store may contain just the items that of the synchronized folder that are available for access/viewing to an application or user. In this embodiment, the local folder view may be constructed by moving or copying realized items to the view folder. It some embodiments, the view may be implemented as a filter that only presents a subset of a main local store for viewing or access. Regardless of implementation however, the view of the synchronized local folder may be tailored by the method and system described herein so that the view complies with local operating system rules and semantics while still providing synchronized context to a plurality of nodes.

Generally, realization may be a process for making the updates available to a view of the local synchronized folder provided to the node applications and node user. In the described method and system, realization may include a process that handles or manages conflicts between the received update content from the feed and a previous view of the synchronized folder. A realization may check for conflicts based on the new feed and local store contents/view before releasing the new feed content to the view of the local folder for access by the user. When no synchronization conflicts exist, or when a synchronization conflict is resolved, realization may generally involve making the item available to the main folder for user or application viewing and access. Conflicts that remain unresolved may be placed in a holding area for later realization.

Generally, in the described system, any resolutions or fixes to the file system for orphans, duplicates, cycles, etc. may be prevented from being reflected back in the feed (e.g., the Storage Service feed may not be updated). In some embodiments, the local fixes may be prevented from being reflected back in the feed altogether. It should be noted that the realization process may be implemented as a recursive process. More specifically, the realization process may involve applying a function to all subfolders and items of a parent folder.

Figure 5:
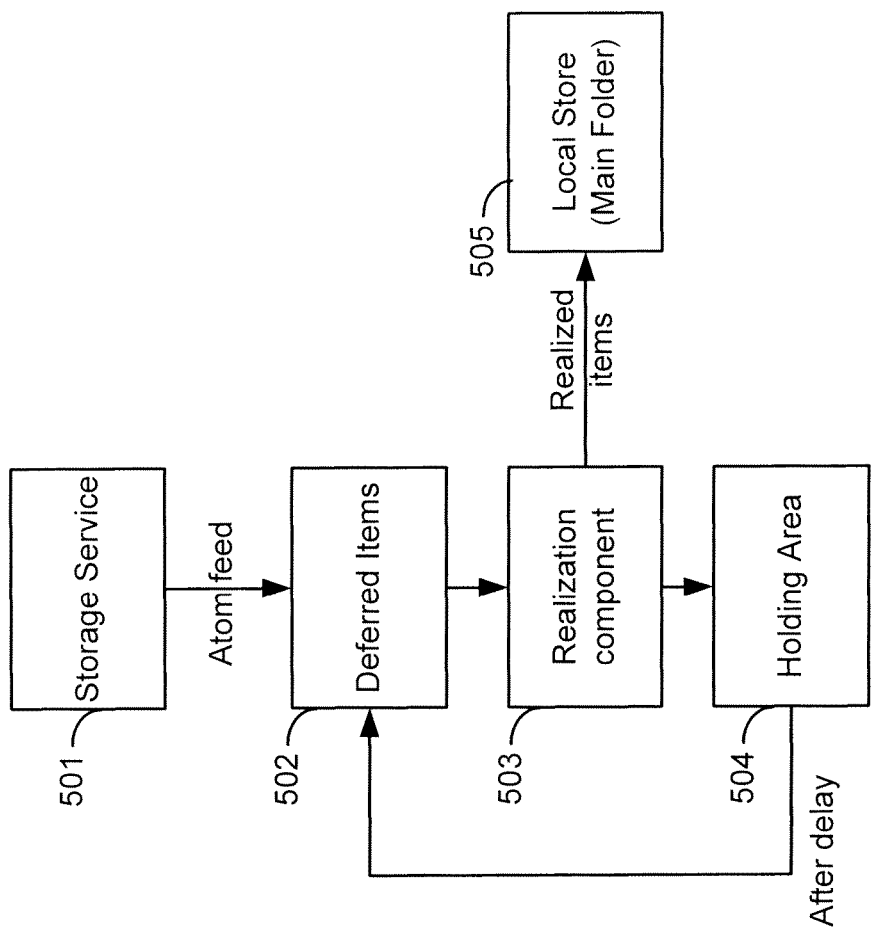
FIG. 5 illustrates a system for managing synchronization conflicts during synchronization of a synchronized folder.

FIG. 5 illustrates a system for managing synchronized folder conflicts during a synchronization of a local folder. The system includes a holding area store 502, a deferred items store 504, and a local store 505. Generally, the local store (which may be called a main folder) may be accessible by a user and may represent a view of the synchronized folder that is displayed to the user as a synchronized folder. The holding area store 504 and deferred items store 502 may be secured from user access (e.g., hidden or otherwise restricted from user access) and used in this embodiment to manage the synchronization conflicts in accordance with the described system (and will be further described below).

Figure 6:
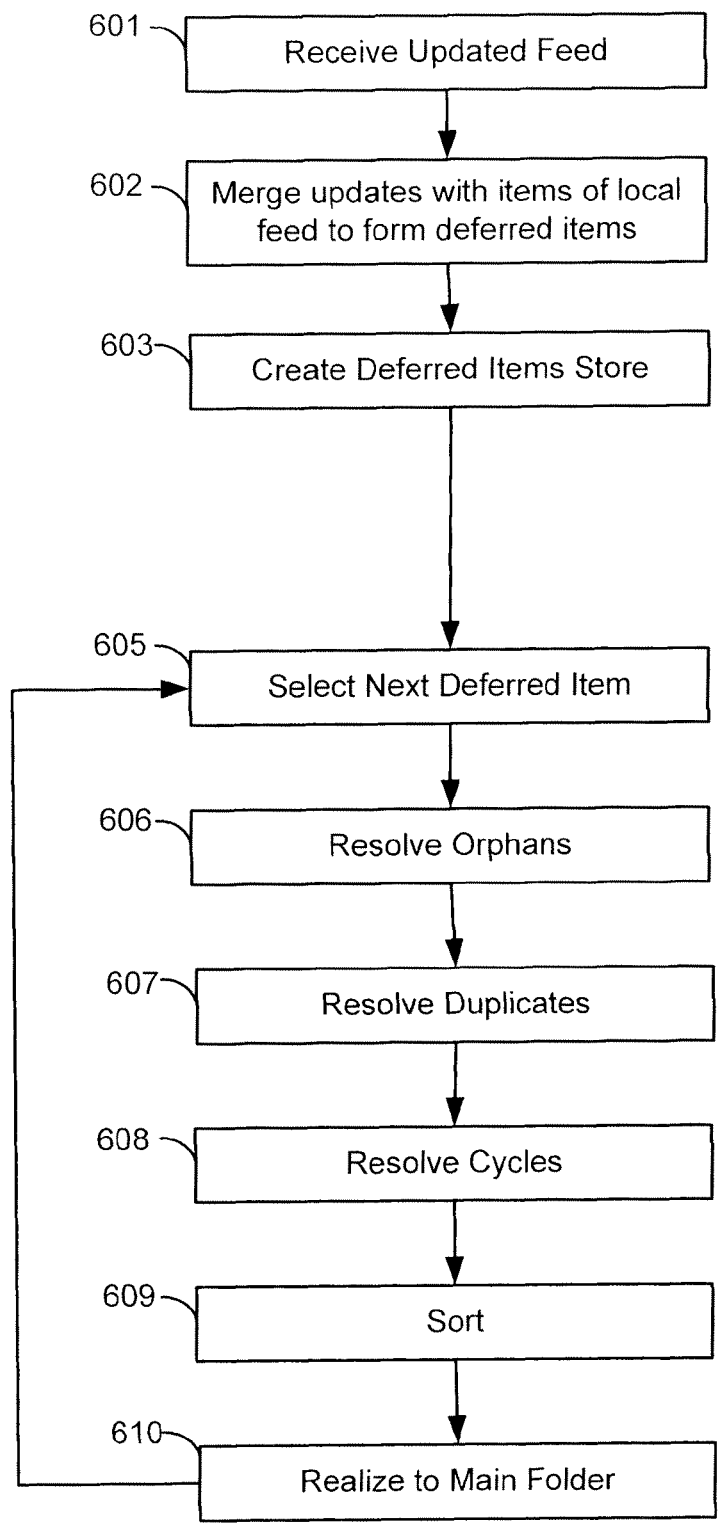
FIG. 6 illustrates a realization process including a conflict resolution mechanism.

FIG. 6 illustrates a realization process including a conflict resolution mechanism. The realization process may be initiated by a number of activities or events. For example, the realization process may be initiated when an updated feed is received 601. It should be noted that the realization process may be initiated by other activities including, but not limited to, a local node originating an update to items in the local store, initiating by a local node of enclosure downloads, etc.

The realization process may involve forming or retrieving a set of deferred items (block 602). A deferred item store may be created at block 603 to store the deferred items. The deferred item store may represent a collection of deferred items. The realization process may involve analyzing each deferred item (blocks 605-609) to detect and resolve synchronization conflicts. A deferred item may be an item of the local copy of the feed that has been updated (e.g., where an update item from the update feed was merged with a corresponding item of the local copy of the feed). The deferred items may include all items of the holding area that were placed there from previous realization processes or runs.

Several types of synchronization conflicts may occur in a synchronized folder system and in the described system, where the conflicts may be checked for and resolved in a recursive manner for each deferred item.

Figure 7:
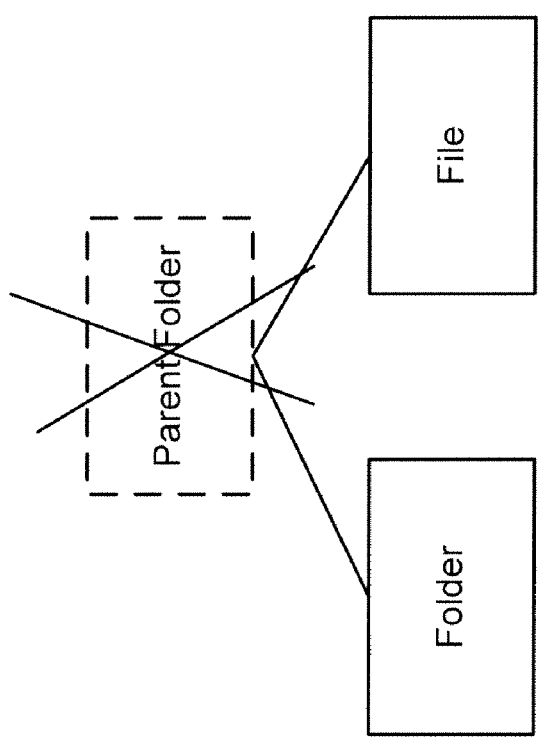
FIG. 7 illustrates a synchronization conflict originating from an orphaned item.

A synchronization conflict originating from an orphaned item is illustrated in FIG. 7. Generally an orphan is an item that is modified at a first node where a folder containing the item is deleted in a second node. The conflict arises as to how to update the synchronized folder when one update involves deleting a folder and where a second update involves modifying an item that belongs to that folder (there is an assumption that the item has importance since it is being modified). The item no longer has a parent folder or relations to a parent folder and thus is termed an orphan.

Another synchronization conflict is duplicate items or simply called duplicates. Duplicates may occur when two items or files have the same name. For example, in some nodes, a local operating system may not be capitalization sensitive (e.g., Windows NTFS) while in other nodes a local operating system may be capitalization sensitive (e.g., Macintosh Hierarchical File System). In some existing systems, a least common denominator approach may be used where the more widely accepted naming system is used (e.g., the most restrictive naming system is used). This approach, however, may involve changes at the central storage service to massage data for accommodating local views. The method and system described herein, on the other hand, may be configured to provide a local view of the synchronized folder that is consistent with local operating system semantics without modifying a source of a feed that is provided to every other node.

Figure 8:
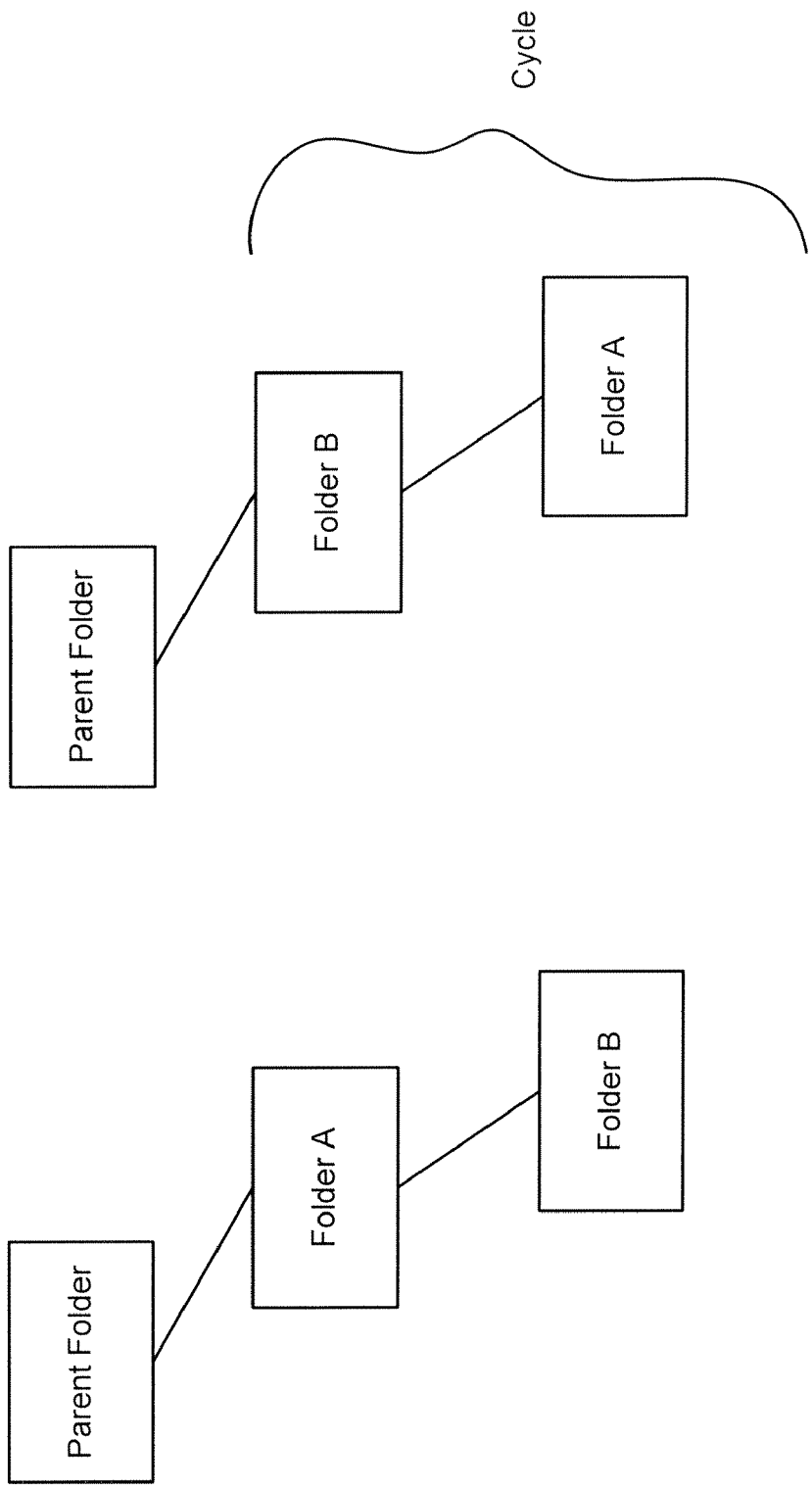
FIG. 8 illustrates a synchronization conflict based on a cycle.

Another synchronization conflict is termed cycles, which is illustrated in FIG. 8. Cycles exist when an arrangement of folders is inverted, as illustrated in FIG. 8. Generally, when folder B is a subfolder of folder A and then folder A is modified to become the subfolder of folder B, we have a conflict that may be termed a cycle. The cycle may include the set of folders that are inverted from another set of folders. Thus, in FIG. 8, a cycle may include the folder set A/B where folder A is a child of folder B.

As illustrated in FIG. 6, the realization process may involve applying a set of realization functions (e.g., 606-608) to each deferred item in the deferred item store, including an orphan resolution function 606, a duplicate resolution function 607, and a cycle resolution function 608. In some embodiments, when realizing enclosures to a file system, the mesh operating environment may be configured to obey a set of restrictions at the local node. Such restrictions may generally be threefold:

1) a file or folder may be required not to be an orphan (unless it is top level or root level), e.g., the parent folder may be required to exist and not be a tombstone (e.g., a file marked for deletion);

2) file and folder names may be required not to be duplicated under a parent folder; and 3) the folder hierarchy may be required to not contain cycles.

When there are no conflicting changes, enclosures in the FeedSync feed may be clear of orphans, duplicates or cycles (to be discussed further below). It should be noted that other conflict resolution functions may be included in other embodiments. However, it may be a requirement of the described method and system that an application may resolve a synchronization conflict only in a deterministic way that would not cause further conflicts if done concurrently in parallel on a plurality of disconnected nodes. Thus, additional conflict resolution functions may be included with this restriction in mind. It should be noted that an item may be allowed to have multiple conflicts simultaneously. Also, depending on the capabilities of the node, other local restrictions (ex. case sensitivity, file name length, valid characters, valid set of file attributes, etc.) may be applied to the folder view.

Figure 9:
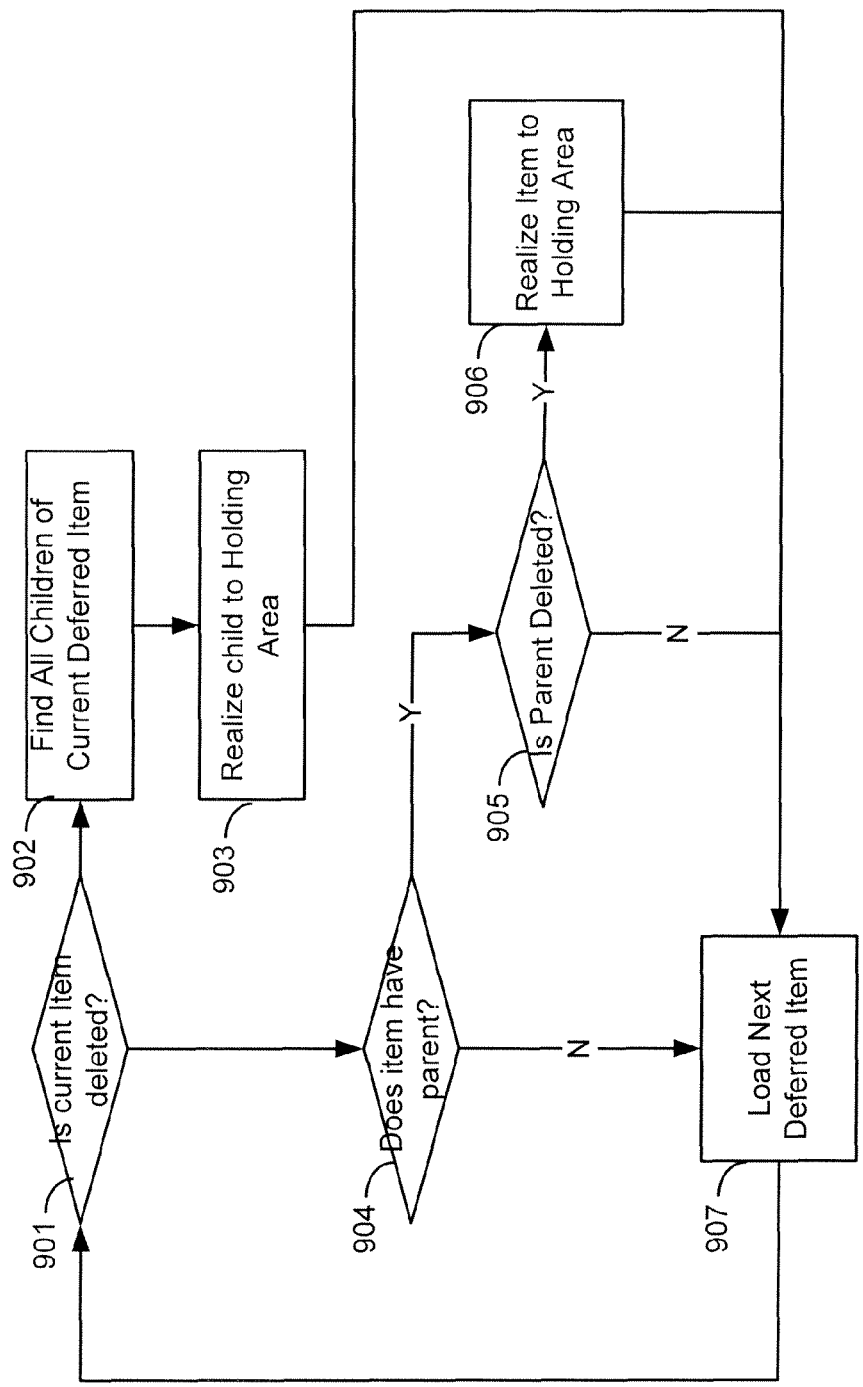
FIG. 9 illustrates an embodiment of a synchronization conflict resolution process for orphans.

FIG. 9 illustrates an embodiment of a synchronization conflict resolution process for orphans. In a synchronization conflict situation involving an orphan, the system may select a winner and a loser update. For example, in the orphan situation described above, one of the folder deletion or the orphan update (without folder deletion) may be chosen as the winner. The looser may be stored in a loser cache designated as the holding area.

In one embodiment, the described process may check a currently processing deferred item to see if the item is deleted 901 (e.g., the feed includes an item marked updated as deleted). If the item is deleted, children of the item may be searched for in block 902 and realized to the holding area at block 903, after which the next deferred item may be selected and processed 907. It should be noted that when searching of children, the described process and method may find a corresponding item of the local synchronized folder, a corresponding deferred item, both a corresponding item of the local synchronized folder and a corresponding deferred item, or no children. When returning a result set of a search for children, the describe process and method may prefer a deferred item (if available) over a local synchronized folder. This may be the chosen priority because the deferred item generally represents newer data. It should be further noted that the same search and priority applied with respect to retrieving orphan children may be applied to other conflict resolution processes described herein. In other words, in some embodiments, whenever a resolution process searches for a corresponding item or related item, the resolution process may find a set of deferred items and local folder items (representing what is viewed by the user). The deferred items (if they exist in the set) may be acted upon or selected for processing over the local folder items.

Continuing with the process of FIG. 9, a block 904 may determine whether the currently processing deferred item has a parent. If the item has no parent, then the next deferred item may be selected and processed 907. If the item has a parent, a block 905 may determine whether the parent is deleted. If the parent is deleted, the current item may be moved to the holding area 906 otherwise, the next deferred item may be selected and processed 907. The process of FIG. 9 may represent process block 606 in FIG. 6.

Figure 10:
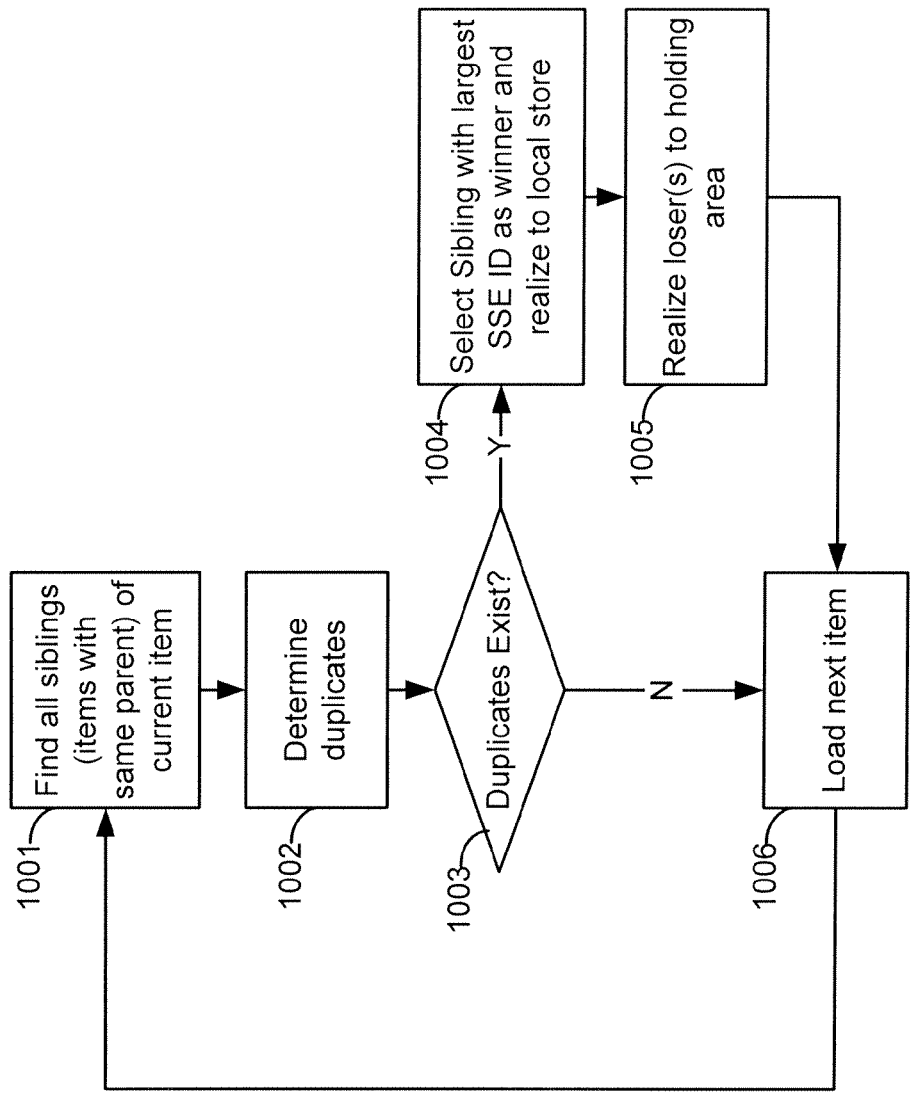
FIG. 10 illustrates a process for resolving synchronization conflicts involving duplicates.

FIG. 10 illustrates a process for resolving synchronization conflicts involving duplicates. For a current or selected deferred item, the system may search for all siblings of the item (or items with the same parent) at block 1001. The system may then determine if duplicates exist within the set of siblings (if any) at block 1002 and 1003. The system may sort any duplicates by FeedSync ID. As discussed above, FeedSync IDs may be assigned at item creation, thereby providing a sequential time stamp as to the origin of the item. Thus, the FeedSync ID may indicate the chronology of an update for a particular item. In one embodiment, the system may be configured to select the duplicate item with the largest FeedSync ID (e.g., the most recent) as a winner for moving to the local store 1004, while sending other duplicate items to the holding area store 1005. In some embodiments, the IDs may sequentially decrease and the ID with the smallest FeedSync ID may be selected as the winner. In some embodiments, regardless of the sequencing (whether increasing or decreasing), the winner may be chosen as the least recent item. It should be noted that a critical factor in determining the method for resolving duplicates is that the method when applied at each of a plurality of nodes, generates the same results. This may be used to ensure that each node provides the same view of the synchronized folder.

The process may then load the next deferred item at block 1006 and repeat the process. The process of FIG. 10 may represent process block 607 in FIG. 6.

Figure 11:
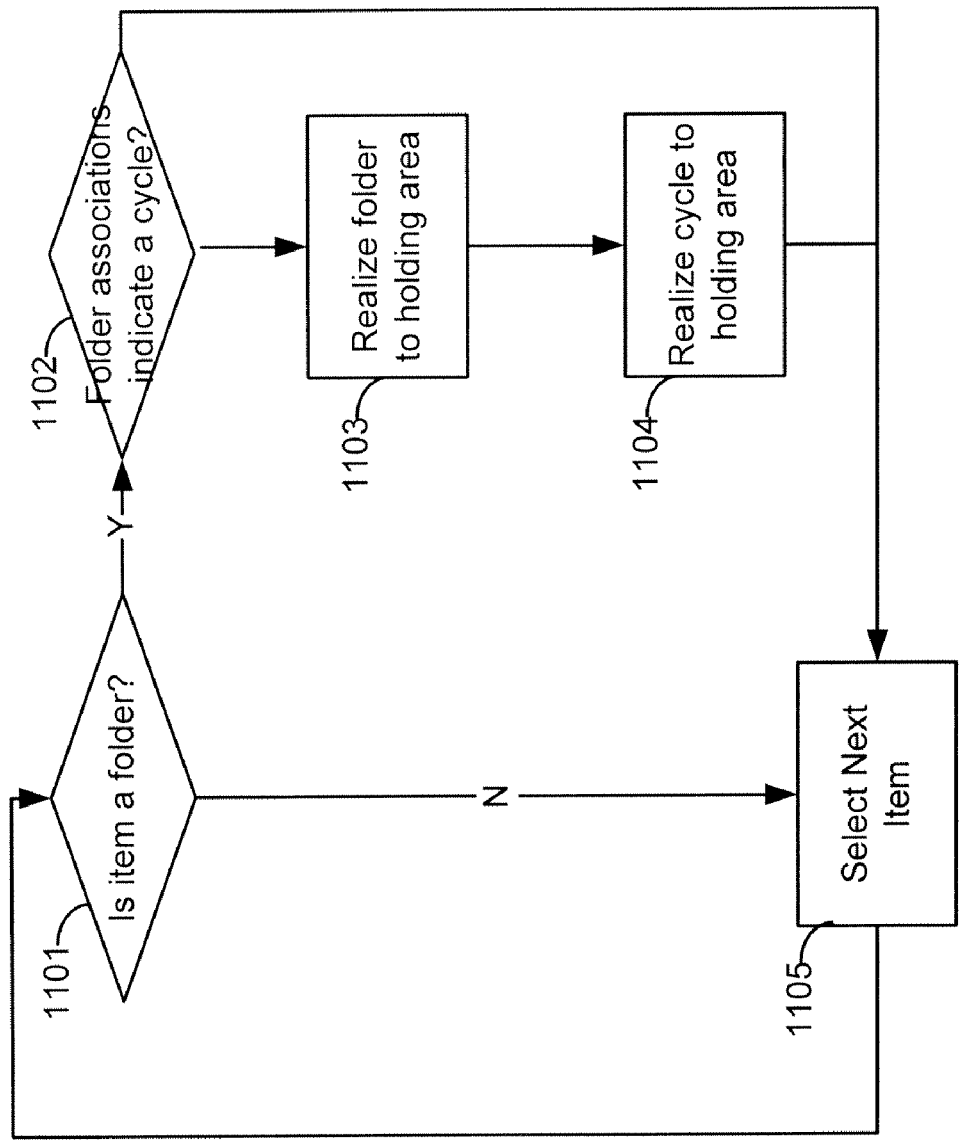
FIG. 11 illustrates a process for resolving synchronization conflicts involving cycles.

FIG. 11 illustrates a process for resolving synchronization conflicts involving cycles. A check may determine whether a currently processing or selected item is a folder 1101. If the item is not a folder, then a next deferred item may be processed 1105. If the item is a folder, folder associations may be checked to determine if cycles exist 1102. If a cycle exists, the current folder may be realized to the holding area 1103 as well as associated folders of the cycle 1104.

In cycle conflicts, both trees may need to be preserved as priority is difficult to assign to one tree versus another. In some embodiments, a synchronized folder may keep its existing structure and place the cycles in the holding area store. In some embodiments, the folder with the older time stamp (smaller FeedSync ID) may be re-parented to a root folder. The root node may be a folder that is a common parent to a cycle and its counterpart cycle. The process of FIG. 11 may represent process block 608 in FIG. 6.

To facilitate the execution of updates from the deferred items to the local folder so as to prevent further conflicts and to maintain order of the updates so that future realization runs may resolve conflicts, a sort function 609 may be used to order the deferred items. The sort function may be configured so that every parent item that is not a tombstone has children that appear sequentially after the parent. For every parent that is a tombstone, its children may be sorted to appear sequentially before the item. In this manner add or modification updates may be performed top-down (hierarchically), while deletes are performed bottom-up. Generally, a tombstone is a placeholder indicating a delete update (e.g., a file that has been deleted by a node).

Another synchronization conflict is when two or more nodes attempt to update or modify one file (represented as an enclosure) of the synchronized folder where each update conflicts with the other. This situation may occur, for example, when a user at node A may modify one file while an update arrives based on a node B update to the same file. The described system may be configured to pick a winner update (or version) and a loser update, where the winner update is realized or moved to the local store while the loser update is realized to the holding area. Final resolution of this conflict may be left to the node or user. In some embodiments, a time stamp of the update feed item and local store item may be compared to determine which is newer and the system may be configured to select the newer version as the winner. The system may still, however, leave final conflict resolution to the end user.

A key operation feature of the described system is that the system may be configured not to automatically update the local copy of the feed (which would prompt updating the Storage Service copy of the feed) to resolve synchronization conflicts. Performing automatic updates on the feed may result in cascading conflicts or even divergence. Thus, in some embodiments of the described system, final resolution of conflicts is primarily left to the end user of the node. This means that the feeds are synchronized within the system with the orphans, duplicates, and cycles intact, and devices may be configured to be tolerant towards the presence of these conflicts (or other limitations), which are held in the holding area.

The described system may use the concept of ghosting or ghost files to help reduce the possibility of file synchronization conflicts. Generally, a ghost file may represent a placeholder for items (folders and files) when an item has been updated and the system is in a process of downloading or realizing that update or when an old file is available and an update is unavailable. In some systems, a zero byte placeholder file is used to represent a ghosted item while a ".ghost" file may be created to indicate a ghost display (e.g., a ghost icon). The ghosted file may alert a user that a file that the user is about to modify is already in a transition state. While there may exist narrow windows of time where ghosting may not catch a concurrency issue, ghosting may help to reduce the possibility of this conflict. For example, when a user manages to begin editing an item in a local synchronized folder before an update notification is broadcast to or received at the local node, a ghosting indication for the item may be initiated.

It should be noted that in some embodiments, a ghosting feature may be set by an end user. For example, to conserve disk space, a user may adjust a setting of the MOE to not download enclosures, but rather ghost them. It should be noted that ghost files may generally be configured so that they cannot be updated (as they represent only placeholders). One operation that may be allowed in some embodiments is deleting a ghost file, which may then cause deletion of the underlying file in the system (via modification of the feed).

Figure 12:
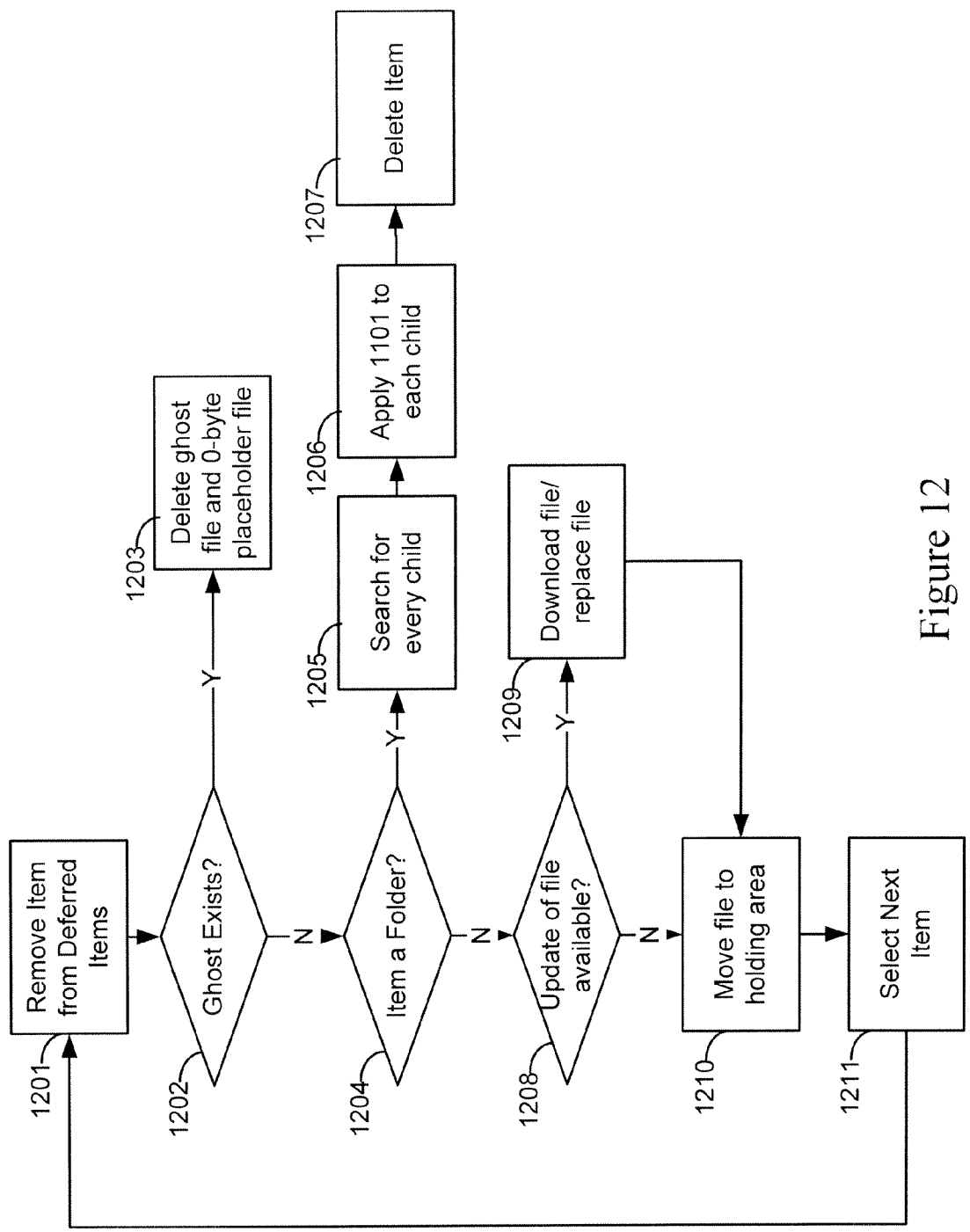
FIG. 12 illustrates a process for realizing items to a holding area.

Realizing the items to the holding area may involve a few process blocks further illustrated in FIG. 12. In realizing an item to the holding area, the item may be removed from a current realization run 1201. This may involve removing the item from the current deferred items collection or store. A current deferred items collection may be closed from item additions until a realization run is finished (e.g., until a set of realization processes have been applied to each deferred item in the collection from a time when the processes were initiated). It should be noted that removing the item from the deferred items in this process may prevent reapplying methods related items such as child items, since the resolution methods described herein may be recursive (e.g., children of the folder may be operated on). A check may be made to determine if the item is ghosted 1202. If the item is ghosted, the ghost files (e.g., a .ghost file and a placeholder file) implementing the ghost feature may be deleted 1203. If the item is not ghosted, a check may be made to determine whether the current item is a folder 1204. If the item is a folder, the method may retrieve each child of the folder 1205 and may apply to each child of the folder the realization-to-holding-area process 1206. The folder may then be deleted 1207.

If the item is not a folder, then the item may be a file. A check may be made to determine whether an update of the file is available 1208. If a new version of the enclosure has been downloaded, the file stored in the holding area may be updated 1209. The file may then be moved to the Holding Area 1210. The process may be repeated for a next item 1211.

Figure 13:
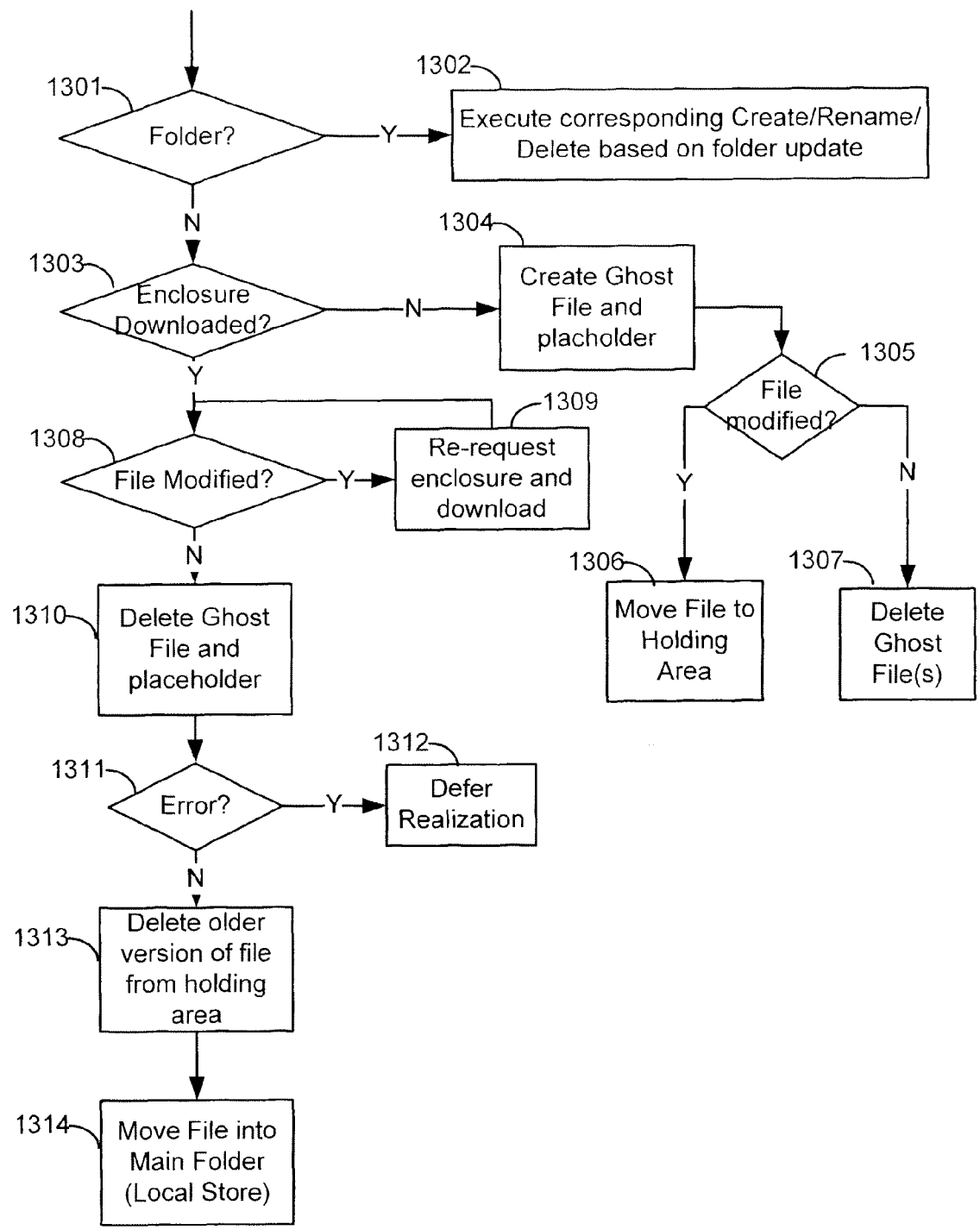
FIG. 13 illustrates a for realizing items to a main folder or local store.

A process embodiment for realizing items to the main folder, or local store, may be illustrated by FIG. 13. A check may be made to determine whether a current item being realized to the main folder is a folder 1301 (as opposed to a file). If the item is a folder, corresponding Create/Rename/Delete commands may be executed based on the item update 1302.

If the item is a file, a check may be made to determine whether an enclosure of the file has been downloaded to the local node 1303. If the enclosure has not been downloaded, ghost files may (e.g., icon and placeholder files) be created to apply the ghost effect or feature 1304. A check may then be made to determine whether the file has been modified 1305. For example, the updated file may be checked against the local store version of the file to determine if either the length/size of the file and/or timestamp is different. If the file has not been modified, the file may be moved to the holding area (e.g., while downloading enclosure) 1306. If the file has been modified, the ghost files may be deleted 1307.

If the enclosure has been downloaded or if the enclosure was realized to the holding area, a check may be made to determine whether the file has been modified 1308. If the file has been modified, the enclosure may re-requested for download 1309. If the file has not been modified, the ghost files may be deleted 1310. If an error is thrown deleting the ghost files, the item may be deferred for realization 1312. If no error occurs, the older version of the file may be deleted from the Holding Area 1313. The file may then be moved into the main folder or local store 1314. In some embodiments, if any further error is thrown, realization may be deferred.

It should be noted that the processes of FIGS. 6, and 9-13 may be implemented as a set of functions. More particularly, a function representative of the process of FIG. 6 may call (block 610) a function representative of the process of FIG. 13. The processes of FIG. 9-11 may call a function representative of the process of FIG. 12.

It should be further noted that the conflict resolution methods described herein generally are provided to a local view of the synchronized folder which is represented by the local store or local folder (main folder). These resolutions may not be adjusted into the feed of the Storage Service. However, when a user resolves a conflict (e.g., those stored in the holding or a current deferred item listing) that conflict may be reflected in the Storage Service feed as an update. For example, a watcher component may detect a user originated change for modification to the Storage Service.

The invention claimed is:

1. A method of resolving conflicts for a synchronized folder comprising:
    creating a synchronized folder as a set of local folders, each local folder associated with one of a plurality of devices, and wherein each local folder is processed to contain a consistent set of items organized by a hierarchical tree structure including parent and child relationships, and wherein an item is a folder or a file;
    creating a holding area store that is restricted from user access;
    receiving at a first node a set of update items of the synchronized folder, wherein the update items each contain an attribute for designating a link to an enclosure of the item and contain metadata indicating a hierarchical position of the item in the hierarchical tree structure;

merging the set of update items with corresponding items of a local feed to form a set of deferred items, wherein the local feed is separate and distinct from a local folder;

creating a deferred items store that is restricted from user access and that holds the deferred items;

executing an orphan conflict resolution process sequentially on the deferred items in the deferred items store to move a set of orphan items to the holding area store;

executing a duplicate conflict resolution process sequentially on the deferred items in the deferred items store to sort a set of duplicate items and to move all but a duplicate item having a most recent update time to the holding area store; and executing a cycle conflict resolution process sequentially on the deferred items in the deferred items store to select a folder item of a cycle having an earliest modification date and re-parenting that folder to a root folder; and updating the local folder with a deferred item that is not moved to the holding area store based on one of the resolution processes.

2. The method of claim 1, further comprising sorting the deferred items, before moving the deferred items, such that for each deferred item that is a parent and is not marked as deleted, children are listed sequentially before the deferred item, and for each deferred item that is a parent and is marked as deleted, children are listed sequentially after the parent deferred item.

3. The method of claim 1, wherein executing an orphan conflict resolution process comprises:

determining if a deferred item is deleted and moving any child of the deleted deferred item in the hierarchy to the holding area store;

determining if a parent of the deferred item is deleted and moving the parent and deferred item to the holding area store if the parent is deleted.

4. The method of claim 1, wherein executing the duplicate conflict resolution process comprises retrieving a set of sibling items of a deferred item, wherein a sibling item is an item that shares a common parent as the deferred item.

5. The method of claim 1, wherein executing the cycle conflict resolution process comprises determining parent and child relationships of a deferred item and determining parent and child relationships of an item of the local folder corresponding to the deferred item, and determining if any parent-child relationship of the deferred item and local folder item are reversed with respect to one another.

6. The method of claim 1, wherein the holding area items are included in the deferred items store after a first sequential run of each of the resolution processes is completed.

7. The method of claim 1, further comprising executing a file enclosure conflict resolution by selecting one conflicting update item having a reference to an enclosure for update to the local folder and a remaining update item for transfer to the holding area store.

8. The method of claim 1, further comprising transmitting an update feed from a local device when a user resolves a conflict at the local device.

9. The method of claim 1, further comprising executing the orphan conflict, duplicate conflict, and cycle conflict resolution process consistently on each of the plurality of devices associated with the synchronized folder.

10. A system for resolving conflicts for a synchronized folder comprising:

a plurality of computing devices configured to communicate with each other over a network, wherein each computing device includes a memory for storing executable instructions and a processor configured to execute the instructions;

a synchronized folder defined as a set of local folders, each local folder associated with one of the plurality of computing devices, and wherein each local folder is processed to contain a consistent set of items organized by a hierarchical tree structure including parent and child relationships, and wherein an item is a folder or a file;

a holding area store that is configured to be restricted from user access;

an application executed on each of the plurality of computing devices, wherein the application is programmed to:

receive a set of item updates for the local folder of the computing device;

execute an orphan conflict resolution routine that moves orphan files and folders to the holding area store;

execute a duplicate conflict resolution routine that sorts a set of duplicate items and moves all but a duplicate file having a most recent update time to the holding area store;

and execute a cycle conflict resolution routine that selects a folder of a cycle with an earliest creation date and re-parents that folder to a root folder; and update the local folder with an item update that is not moved to the holding area store based on the orphan conflict, cycle conflict, and duplicate conflict resolution routines.

11. The system of claim 10, further comprising a storage service that provides an atom feed to the computing device, wherein the atom feed is used to provide the set of item updates to the local synchronized folder of the computing device.

12. The system of claim 11, wherein the application is further programmed to notify a storage service of an update to the synchronized folder when a user modifies the local folder to resolve a holding area item.

13. The system of claim 10, further comprising a deferred items collection that is restricted from user access and that holds a set of deferred items, wherein the set of deferred items are formed by merging each update item with a corresponding item of a local feed, the local Iced being separate and distinct from the local folder.

14. The system of claim 13, wherein the application is further programmed to execute the orphan conflict resolution routine, the duplicate conflict resolution routine, and the cycle conflict resolution routine recursively on each item of the deferred items collection.

15. The system of claim 10, wherein the application is further programmed to execute a file enclosure conflict resolution routine by selecting one update item having a reference to an enclosure for update to the local folder and a remaining update item for transfer to the holding area store.

16. A computer-storage medium coupled to a processor and containing computer-executable instructions for performing operations comprising:

creating a local copy of a synchronized folder at a first device, wherein the synchronized folder includes a plurality of folders each located on a different computing device;

creating a holding area store on the first device that is configured to be restricted from user access;

receiving a feed containing a set of update items, wherein each update item contains an attribute for designating a link to an enclosure and metadata indicating a hierarchical position of the update item in a tree structure;

merging each update item with an item of the local copy of the synchronized folder that corresponds with the update item to form a set of deferred items;

executing an orphan conflict resolution process sequentially on each deferred item to move a set of orphan items to the holding area store;

executing a duplicate conflict resolution process sequentially on each deferred item to determine a set of duplicate items and to move all but a duplicate item having a most recent update time to the holding area store; and executing a cycle conflict resolution process sequentially on each deferred item to select a folder of a cycle having an earliest modification date and re-parenting that folder to a root folder; and updating the local copy of the synchronized folder with a set of deferred items not moved to the holding area store.

17. The computer storage medium of claim 16, further containing instructions comprising transmitting an update feed from the first device when a user resolves a conflict at the first device.

18. The computer storage medium of claim 16, further containing instructions comprising notifying a storage service of an update to the synchronized folder when a user modifies the synchronized folder to resolve a holding area item.

19. The computer storage medium of claim 16, further containing instructions comprising executing a file enclosure conflict resolution process by selecting one update item having an enclosure for update to the local folder and a remaining update item for transfer to the holding area store.

20. The computer storage medium of claim 16, further containing instructions comprising executing the orphan, duplicate, and cycle conflict resolution processes a second time on the items moved to the holding area store.

* * * * *